United States Patent [19]
Cidon et al.

[11] Patent Number: 5,343,473
[45] Date of Patent: Aug. 30, 1994

[54] METHOD OF DETERMINING WHETHER TO USE PREEMPT/RESUME OR ALTERNATE PROTOCOL FOR DATA TRANSMISSION

[75] Inventors: Israel Cidon, Haifa, Israel; Richard M. Doney, Durham, N.C.; John E. Drake, Jr., Pittsboro, N.C.; Elizabeth A. Hervatic, Apex, N.C.; Kenneth H. Potter, Jr., Raleigh, N.C.; Theodore E. Tedijanto, Cary, N.C.

[73] Assignee: International Business Machines Corporation, Armonk, N.Y.

[21] Appl. No.: 927,697

[22] Filed: Aug. 7, 1992

[51] Int. Cl.$^5$ ............................................. H04Q 1/39
[52] U.S. Cl. ................................. 370/85.6; 370/99; 370/94.1; 340/825.51
[58] Field of Search .................... 370/85.6, 43, 85.3, 370/95.3, 99, 94.1, 94.2; 395/275, 325, 700; 340/906, 825.5, 825.51

[56] References Cited

U.S. PATENT DOCUMENTS

| | | | |
|---|---|---|---|
| 4,500,987 | 2/1985 | Hasegawa | 370/85.6 |
| 4,542,380 | 9/1985 | Beckner et al. | 370/43 |
| 4,707,693 | 11/1987 | Hessel | 370/85.6 |
| 5,051,946 | 9/1991 | Cubranich et al. | |

Primary Examiner—Benedict V. Safourek
Assistant Examiner—Huy D. Vu
Attorney, Agent, or Firm—Gerald R. Woods

[57] ABSTRACT

A method is disclosed for determining whether to use a preempt/resume protocol or an alternate protocol in transmitting data packets from a local system to a remote system. Each system informs the other whether it supports preempt/resume and provides the sizes of the largest low priority data packets it can send and receive. The local system always elects the alternate protocol unless both support preempt/resume. The local system then selects the lesser of (a) the largest low-priority data packet it can send and (b) the largest low-priority data packet the remote system can receive. Use of prompt/resume is initiated by the local system only where a packet of the selected size would be delayed in reaching the remote system by more than a predetermined interval.

1 Claim, 4 Drawing Sheets

| FIELD IN LINK ACTIVATION CONTROL MESSAGE | CONTROL MESSAGE A→B | CONTROL MESSAGE B→A | LINK DIRECTION DESCRIBED BY FIELD IN CONTROL MESSAGE | RESOLUTION | COMMENT |
|---|---|---|---|---|---|
| HIGH-PRIORITY TRAFFIC SUPPORTED | YES | YES | A↔B | YES | HIGH-PRIORITY PACKETS WILL BE SUPPORTED ON THIS LINK, SINCE BOTH ENDS SUPPORT IT. |
| MAXIMUM LOW-PRIORITY PACKET SIZE SUPPORTED | RECEIVE = 5KB | TRANSMIT = 1KB | B→A | 1KB | B WILL TRANSMIT A MAXIMUM LOW-PRIORITY PACKET SIZE OF 1KB, WHICH IS MIN (5KB, 1KB). |
| MAXIMUM LOW-PRIORITY PACKET SIZE SUPPORTED | TRANSMIT = 9KB | RECEIVE = 8KB | A→B | 8KB | A WILL TRANSMIT A MAXIMUM LOW-PRIORITY PACKET SIZE OF 8KB, WHICH IS MIN (8KB, 9KB). |

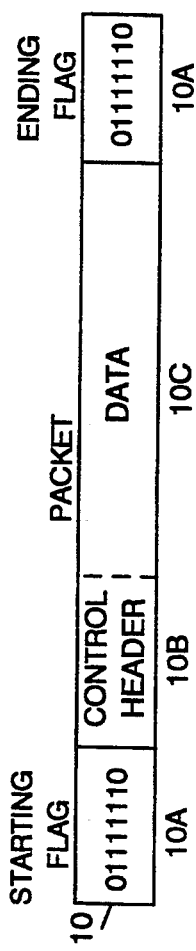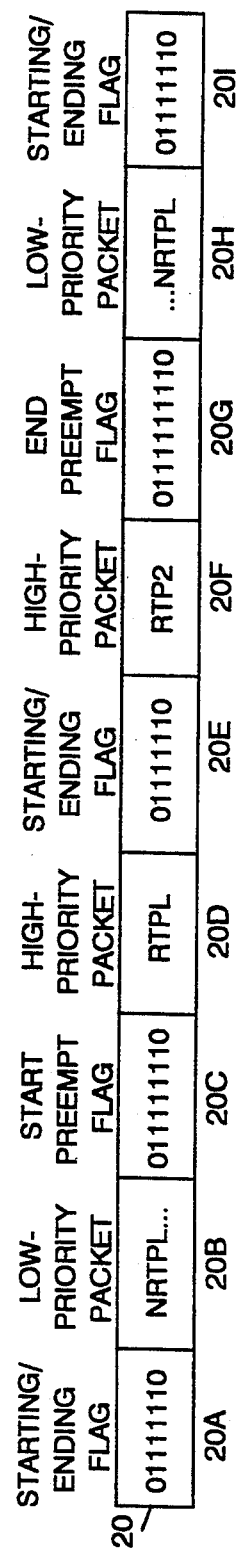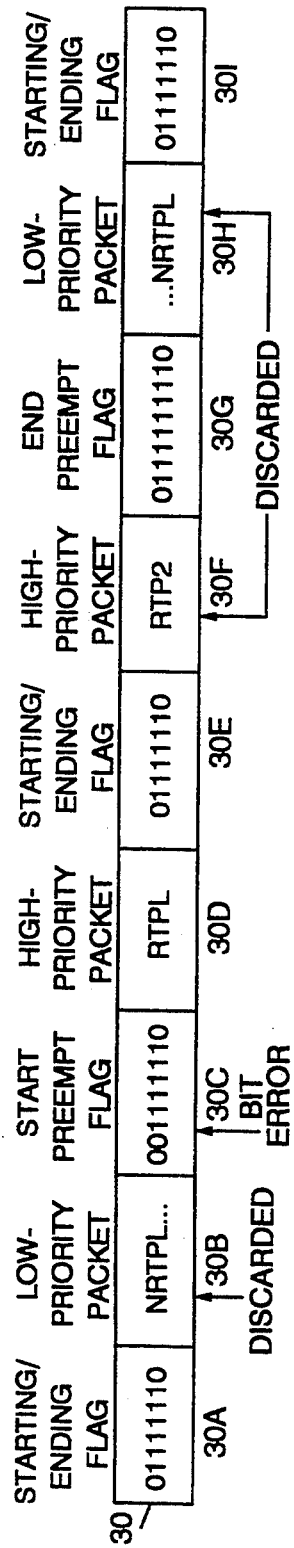

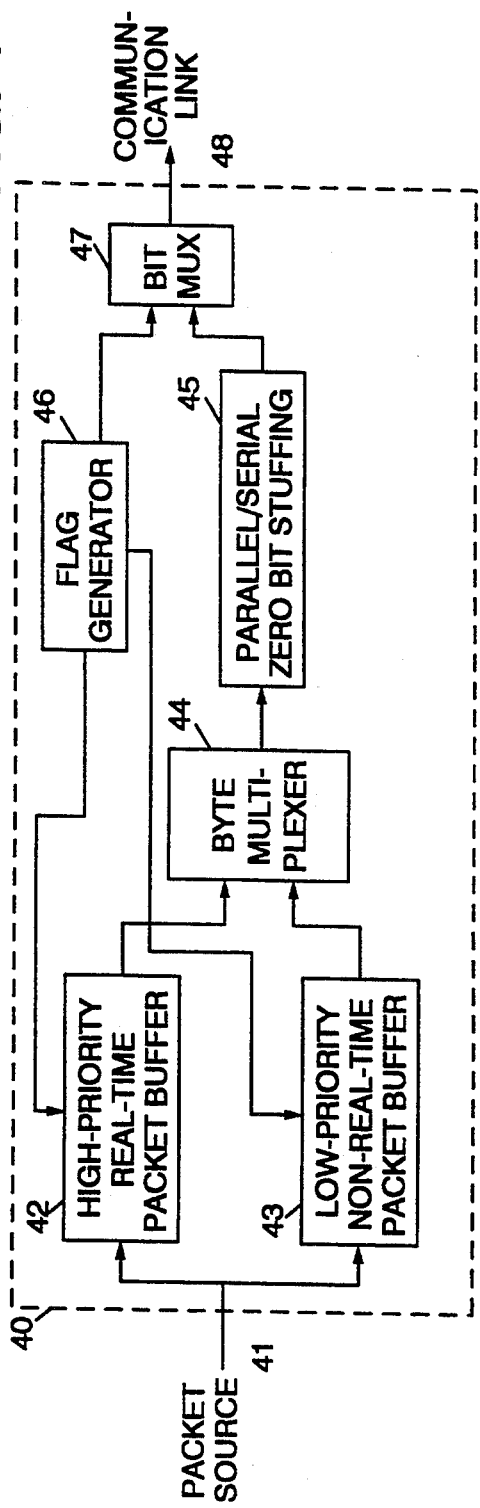
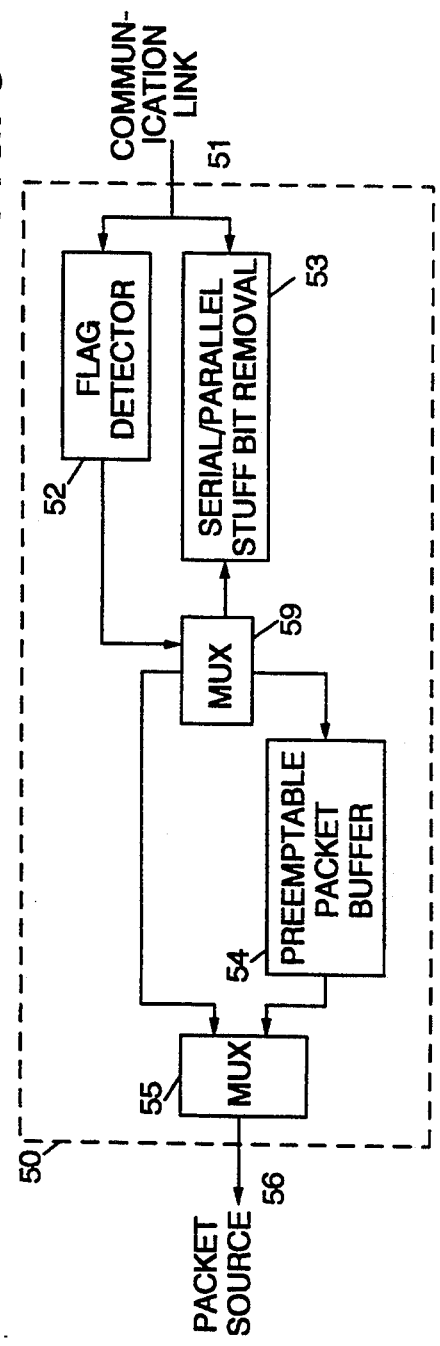

FIG. 6

| FIELD IN LINK ACTIVATION CONTROL MESSAGE | CONTROL MESSAGE A→B | CONTROL MESSAGE B→A | LINK DIRECTION DESCRIBED BY FIELD IN CONTROL MESSAGE | RESOLUTION | COMMENT |
|---|---|---|---|---|---|
| HIGH-PRIORITY TRAFFIC SUPPORTED | YES | YES | A↔B | YES | HIGH-PRIORITY PACKETS WILL BE SUPPORTED ON THIS LINK, SINCE BOTH ENDS SUPPORT IT. |
| MAXIMUM LOW-PRIORITY PACKET SIZE SUPPORTED | RECEIVE = 5KB | TRANSMIT = 1KB | B→A | 1KB | B WILL TRANSMIT A MAXIMUM LOW-PRIORITY PACKET SIZE OF 1KB, WHICH IS MIN (5KB, 1KB). |
| MAXIMUM LOW-PRIORITY PACKET SIZE SUPPORTED | TRANSMIT = 9KB | RECEIVE = 8KB | A→B | 8KB | A WILL TRANSMIT A MAXIMUM LOW-PRIORITY PACKET SIZE OF 8KB, WHICH IS MIN (8KB, 9KB). |

FIG. 7

| INPUT→ STATE | 7E | 7E* | RTP | NRTP | SP | EP | IC |
|---|---|---|---|---|---|---|---|
| IDL | RDY | | IDL | IDL | IDL | IDL | IDL |
| RDY | RDY | | RRTP STRT_R | RNRTP STRT_N | IDL | IDL | IDL |
| RRTP | RDY END_R | RDY ABRT_R | RRTP MORE_R | | IDL ABRT_R | IDL ABRT_R | IDL ABRT_R |
| RNRTP | RDY END_N | RDY ABRT_N | | RNRTP MORE_N | P_RDY1 | IDL ABRT_N | IDL ABRT_N |
| P_RDY1 | P_RDY2 | | P_RRTP STRT_R | IDL ABRT_N | P_IDL2 | IDL ABRT_N | P_IDL2 |
| P_RDY2 | P_RDY2 | | P_RRTP STRT_R | RNRTP ABRT_N STRT_N | P_IDL2 | IDL ABRT_N | P_IDL2 |
| P_RDY3 | P_RDY3 | | P_RRTP STRT_R | RNRTP ABRT_N STRT_N | P_IDL3 | P_END | P_IDL2 |
| P_RRTP | P_RDY3 END_R | P_RDY3 ABRT_R | P_RRTP MORE_R | | P_IDL3 ABRT_R | P_END END_R | P_IDL3 ABRT_R |
| P_IDL2 | P_RDY2 | | P_IDL2 | P_IDL2 | P_IDL2 | P_IDL2 | P_IDL2 |
| P_IDL3 | P_RDY3 | | P_IDL3 | P_IDL3 | P_IDL3 | P_IDL3 | P_IDL3 |
| P_END | RDY ABRT_N | | | RNTP MORE_N | P_RDY1 | IDL ABRT_N | IDL ABRT_N |

NOTE: ENTRIES WITHOUT VALUES REPRESENT INPUTS THAT CAN NOT BE DETECTED WHILE IN THE CURRENT STATE.

METHOD OF DETERMINING WHETHER TO USE PREEMPT/RESUME OR ALTERNATE PROTOCOL FOR DATA TRANSMISSION

FIELD OF THE INVENTION

The present invention relates to data communications networks and more particularly to a data communications network having the capability of processing both high priority packets and low priority packets using a preempt-resume protocol.

BACKGROUND OF THE INVENTION

Communications systems traditionally have used packet switching techniques for carrying bursty data traffic and have used circuit switching techniques for carrying multiplexed real-time traffic such as voice and video. Circuit switching techniques are typified by a time-division multiplexed voice telephone network in which the traffic is sent as a continuous stream of bits. Packet switching techniques, on the other hand, have been developed to handle bursty data over digital networks in which destination and drop-off addresses are combined with the message data. Each packet is delimited by flags and contains address/routing headers, priority definers and error checkers. Traditional packet networks are characterized by significant per packet processing in the intermediate nodes of a network. This processing has limited the throughput of packet nodes and introduced high delays for packets. To achieve higher throughput and to reduce this delay, fast packet switching networks have been defined which minimize the amount of processing required in intermediate nodes.

This simplified intermediate node processing now makes it feasible for packet networks to carry, in the form of packets, traffic traditionally carried only over circuit switched networks. In addition, this traffic in packetized form can share the same packet network including communication links with the bursty data traffic. However since the traditional circuit switched traffic had stringent bounds on total allowable delay across the network as well as variability of delay, nodes in the packet network must ensure that this traffic receives priority handling. To accomplish this, packets carrying bursty data traffic can be assigned to a non-real-time priority while packets carrying the traditional circuit model traffic can be assigned a higher, real-time priority. A node in a fast packet network contains buffers for holding packets waiting for transmission on its communication links. Packets waiting for transmission can be held in buffers managed differently, depending on the priority, assigned to the packets.

A communication node in a network can adopt a number of different service policies in order to transmit packets from the different priority buffers: priority with no preemption, preemption with retransmission, and preemption with resume. When no preemption is used, the packet priority is only examined to determine from which buffer to select the next packet for transmission. If a high-priority packet is placed in the buffer while a low-priority packet is being transmitted, the high-priority packet must wait until the current transmission is completed. A preemption with retransmission service policy means that the node will abort the transmission of a low-priority packet upon the arrival of a high-priority packet and immediately transmit the high-priority packet. Once all high-priority packets have been transmitted, transmission of the preempted low-priority packet will be restarted from the beginning of the packet. A preemption with resume service policy is similar except the preempted low-priority packet is restarted from the point of interruption rather than the beginning.

The selection of the appropriate service policy is dependent on the characteristics of the communication link, the delay requirements of the high-priority packets, and the size of the low-priority packets. If the transmission rate of the communication link is high enough compared to the size of the longest low-priority packet, then the delay incurred by a high-priority packet waiting for a low-priority one to complete may be acceptable. In this case, the priority with no preemption service policy is preferable since it is easier to implement and may have slightly lower link overhead. If the usage efficiency of the communication link is not important but the delay associated with waiting for completion of the low-priority packets is too high, than the preemption with retransmission service policy may be acceptable. However, if the usage efficiency of the communication link is important and the priority with no preemption service policy does not meet the delay requirements, then the preempt with resume service policy may be required.

Various schemes exist for transmitting packetized information over communication links. The typical scheme used over low speed serial links up to T3 speeds is based on the HDLC MAC-layer protocol. Each packet is delimited by starting and ending flags (X'7E'). The ending flag for one packet may also be the starting flag for the next packet. The packet itself consists of an integral number of bytes of data. Since the contents of the packet may include bit patterns that are the same as the flag pattern, a technique known as bit stuffing is used to differentiate the data from the flags. The transmitter inserts a '0' bit after any sequence of five contiguous '1' bits in the packet data. Likewise, the receiver removes any '0' bit immediately following a sequence of five '1' bits in the received bit stream. When no packets are waiting to be transmitted, flags are repeatedly transmitted.

Both the priority with no preemption and the preemption with retransmission service policies can be implemented using the existing HDLC MAC-layer protocol.

SUMMARY OF THE INVENTION

The present invention relates to method and apparatus for effecting a modified HDLC MAC-layer protocol providing preemptive priority with resume over a serial communication link.

Also when a communication link is activated, the two communications systems at each end of the link exchange control information about their respective packet capabilities. The control information describes the maximum supported low-priority packet size supported in the transmit and receive direction and the ability of the communications system to support high-priority packets. Using the information exchanged along with the communication link's data rate and the maximum acceptable delay for high-priority packets, each communications system independently determines whether the preempt/resume protocol should be enabled or whether a simple priority with no preemption the protocol should be used.

BRIEF DESCRIPTION OF THE DRAWINGS

FIG. 1 shows a basic packet frame used in the practice of this invention, where packet containing header and data is delimited by flags;

FIG. 2 shows the valid combination of formatted packet frames in which a low-priority packet is preempted by a high-priority packet with subsequent automatic resumption;

FIG. 3 shows a combination of packet frames containing a bit error which causes a transmission abort;

FIG. 4 shows a block diagram of the transmit portion of a communication link interface of a communications system to which this invention is applicable;

FIG. 5 shows a block diagram of the receive portion of a communication link interface of a communications system to which this invention is applicable;

FIG. 6 is a table used in explaining how maximum permissible packet size and the need for preempt/resume protocols is determined in each direction of a communication link; and FIG. 7 is a finite state machine table showing preempt/resume states.

DETAILED DESCRIPTION OF THE INVENTION

This invention defines a preempt/resume protocol extension to the existing HDLC MAC-layer packet framing protocol used on serial communication links, to allow the preemption of low-priority packets so that high-priority packets may be transmitted with minimal delay. A link activation protocol is also defined to determine whether the preempt/resume protocol extension should be enabled. During the link activation, normal HDLC MAC-layer framing protocol is used to transmit packets across the communication link. Also if the link activation determines that preempt/resume should not be used, all packets are sent using the HDLC MAC-layer framing protocol with simple priority without preemption.

Enabling Preempt/Resume Protocol Extension

Determination of when to use the preempt/resume protocol extension is based on the support of high-priority traffic, low-priority packet sizes supported, communication link speed, and maximum acceptable delay of high-priority packets. The two communications systems on each end of the communication link can determine the need for the preempt/resume protocol independently for their direction of the link. During link-activation, each communications system sends a control message to its neighbor at the other end over the communication link using the normal HDLC MAC-layer framing. The control message contains the following fields:

A High-Priority Traffic Supported field indicates whether the sending system supports high-priority traffic on its link.

A Maximum Received Low-Priority Packet Size Supported field defines the maximum packet size that the sender can receive.

A Maximum Transmitted Low Priority Packet Size Supported field defines the maximum packet size that the sender can transmit.

If high-priority traffic is not supported, the receiver must verify that each packet received is a low-priority packet. If a packet identified as high-priority packet is received, it is discarded by the receiver.

The following example, described with reference to FIG. 6, shows how communications systems A and B each determine the maximum low-priority packet size supported in each direction and whether preempt/resume protocol extension should be enabled.

Transmission of a high-priority packet may not be delayed by a low-priority packet for more than T, where in the following example T=0.5 msecs. A sender that supports high-priority traffic must either transmit:
without preempt/resume protocol, which constrains the low-priority packet size to satisfy the equation $$\frac{\text{packet size}}{\text{link speed}} \leq T$$

or with preempt/resume.

For link direction A to B, the maximum low-priority packet size is 8KB. Assuming a link speed of 18.432 Mbps, the above inequality is not satisfied since $$\frac{8 \text{ Kbytes}}{18.432 \text{ kbits per msec}} = 3.56 \text{ msecs} > 0.5 \text{ msecs}$$

Therefore, to satisfy the delay requirements, the preempt/resume protocol is required. This means that communications system A will transmit preempted packets and that communications system B must support receipt of preempted packets.

For link direction B to A, the maximum low-priority packet size is 1KB. The above inequality is satisfied as $$\frac{1 \text{ Kbytes}}{18.432 \text{ kbits per msec}} = 0.44 \text{ msecs} < 0.5 \text{ msecs}$$

and the preempt/resume protocol is not to be used. This means that communications system B will not transmit preempted packets and that communications system A will interpret preempt flags as error conditions.

If a particular communications system has not implemented the preempt/resume protocol extension but supports high-priority packets, it will select a maximum low-priority packet size no greater than the value of link speed×T. Using this value, the communications system on the other end of the communication link will correctly determine that the preempt/resume protocol is not to be used.

Preempt/Resume Protocol Extension

In the following description, bit sequences may be described using either conventional binary representation or, for the sake of convenience, hexadecimal representation.

The protocol for allowing high-priority packets to temporarily preempt low-priority packets uses three types of flags to delimit packets: a normal flag which can be a starting, ending or idle flag, a start-preempt flag and an end-preempt flag. The normal flag is defined as the 8-bit sequence B'01111110' (X'7E'). The start-preempt flag is defined as the 9-bit sequence B'011111110' and the end-preempt flag is defined as the ten-bit sequence B'0111111110'. All flags are on byte boundaries with respect to the packet data that they delineate. To differentiate flag bit sequences from bit sequences within the packets, zero bit stuffing is used in the packet data. An extra '0' bit is inserted in the transmitted bit stream after each occurrence of five consecutive '1' bits in a packet. A sequence of more than eight '1' bits indicates an error condition aborting the current packet being transmitted and received. Also a sequence of more than six '1' bits indicates an abort condition if the preempt/resume protocol is not enabled.

The following is a set of rules adopted for a practical preempt/resume protocol.

- The bit sequence B'01111110' (X'7E') always defines byte alignment and may occur any number of times before and after complete packets.
- Six '1' bits preceded by a '0' bit that is not byte aligned with received packet data is an invalid code.
- Nine '1' bits preceded by a '0' bit that is byte aligned is also an invalid code.
- Receipt of an invalid code aborts the current packet and all subsequent packets are aborted until X'7E' occurs.
- Verification that the preempted packet is a low-priority packet is performed.
- Verification that packets received during preemption are high-priority packets is also performed.
- A low-priority packet cannot be preempted until the first byte is transmitted.
- Receipt of the start-preempt flag (B'011111110') immediately followed by the end-preempt flag (B'0111111110') aborts the preempted packet and ends preempt mode.

Under the foregoing rules, the following is a valid combination of packets and flags when preempt/resume is not enabled:

7E{[7E][RIP 7E][NRTP 7E]}

Under the foregoing rules, the following is a valid combination of packets and flags when preempt/resume is enabled:

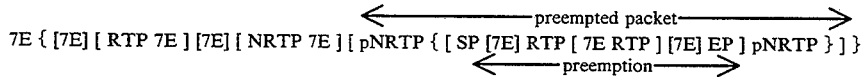

7E { [7E] [ RTP 7E ] [7E] [ NRTP 7E ] [ pNRTP { [ SP [7E] RTP [ 7E RTP ] [7E] EP ] pNRTP } ] } where
- [] denotes optional and repeatable fields
- {} denotes required, repeatable fields
- 7E represents the byte-aligned flag (B'01111110', X'7E')
- RTP represents a high-priority packet
- NRTP represents a low-priority packet
- pNRTP represents portions of a preempted low-priority packet
- SP represents a start-preempt flag (B'011111110')
- EP represents an end-preempt flag (B'0111111110')

FIG. 1 shows a conventional frame 10 delimited by normal (starting and ending) 7E flags 10a and containing both a control header 10b field and a data 10c field.

FIG. 2 illustrates in frame sequence 20 a preempt valid operation in more detail with the case of a low-priority packet being preempted by two consecutive high-priority packets. The first field 20a shows the normal byte-aligned starting flag X'7E'. The second field 20b is an ongoing low-priority packet NRTP1. The third field 20c shows a start-preempt or SP flag bit by bit. This SP flag interrupts the low-priority packet and indicates the transmission of the remainder of the low-priority packet NRTP1 is suspended. The fourth field 20d represents the first high-priority packet RTP1. The fifth field 20e shows the recurrence of a normal flag indicating the completion of the RTP1 packet. The transmission of the second high-priority packet RTP2 begins immediately in the sixth field 20f, without reversion to NRTP1. The seventh field 20g contains an end-preempt flag EP. Thereafter the remainder of the preempted low-priority packet NRTP1 is completed, as shown in the eighth field 20h. Finally, in the ninth field 20i, the normal flag X'7E' indicates the end of NRTP1 and returns the system to the ready state.

FIG. 3 illustrates in frame sequence 30 the case of a bit error corrupting the start-preempt flag SP in the third field 30c. The bit error would typically be caused by a transmission error on the communication link. The first and second fields 30a and 30b are identical with the same fields in FIG. 2. The third field 30c shows a double '0' at the beginning of what otherwise would be a normal flag. Since the flag does not occur on a byte-aligned boundary with respect to the low-priority packet NRTP1 in the second field 30b, then NRTP1 is invalid and discarded. The high-priority packet RTP1 in the fourth field 30d is saved because it is surrounded by valid flags in the third and fifth fields 30c and 30e. The second high-priority packet RTP2 in the sixth field 30f is discarded, however, because it is followed by an end-preempt flag EP in the seventh field 3g, when no valid start-preempt flag SP was detected due to the bit error. All packets thereafter are discarded until the normal flag X'7E' appears, as in the ninth field 30i.

The preempt/resume states of this invention can be summarized by a Finite State Machine (FSM) Table shown in FIG. 7. Since this preempt/resume protocol is a "bit-oriented" protocol, the complete FSM describing the protocol machine (the sender or the receiver) is also at the bit level. However, for the sake of clarity, the following describes only the FSM in terms of detected "sequences of bits", which captures those state transitions which are associated with preemption. Furthermore, for the purpose of describing the protocol, it is believed to suffice to show the FSM for a receiver only.

The following is a list of the FSM states, inputs and outputs (actions) along with their description.

| STATE | DESCRIPTION |
|---|---|
| idl | Idle, expecting "7E". |
| rdy | Just received "7E" or non-byte-aligned "7E*", ready to receive either high-priority packet or low-priority packet |
| rrtp | Receiving high-priority packet |
| rnrtp | Receiving low-priority packet |
| p_rdy1 | Just entered preemption mode (just received start-preempt flag SP), ready to receive high-priority packet or "7E" |
| p_rdy2 | In preemption mode, just received either "7E" or "7E*", no high-priority packet has been received yet during current preemption |
| p_rdy3 | In preemption mode, just received either "7E" or "7E*", ready to receive a high-priority packet, at least one high-priority packet has already been received during current preemption |
| p_rrtp | Receiving high-priority packet in preemption mode |
| p_idl2 | Idle in preemption mode, expecting "7E", no high-priority packet has been received yet during the current preemption |
| p_idl3 | Idle in preemption mode, expecting "7E", at least one high-priority packet has already been received during the current preemption |

| | -continued |
|---|---|
| p_end | Just exited preemption mode (just received end-preempt flag EP), expecting data (the continuation of the preempted low-priority packet) |
| INPUT | DESCRIPTION |
| "7E" | Normal starting/ending/idle flag, X"7E" (does not share bit with prior flag) |
| "7E*" | X"7E" flag not byte-aligned with received data bytes |
| RTP | Data (non-flag) byte from a high-priority packet, distinguished from NRTP by a control bit in the first byte of a string, indicating packet priority. Zero bit stuffing is performed on sequences of these bytes. |
| NRTP | Data (non-flag) byte from a low-priority packet, distinguished from RTP by a control bit in the first byte of a string, indicating packet priority. Zero bit stuffing is performed on sequences of these bytes. |
| SP | Start-preempt flag B"01111110" (seven 1's) |
| EP | End-preempt flag B"0111111110" (eight 1's) |
| IC | Invalid codes, include non-byte-aligned SP, non-byte-aligned EP, a run of six "1" bits right after a flag or B"0111111111" (nine 1's), or B"01111111" (seven 1's) when preempt/resume is not enabled |
| OUTPUT | DESCRIPTION |
| strt_R | Indicate start of received high-priority packet and forward first byte |
| strt_N | Indicate start of received low-priority packet and forward first byte |
| more_R | Forward another byte of high-priority packet |
| more_N | Forward another byte of low-priority packet |
| end_R | Indicate end of receiving high-priority packet |
| end_N | Indicate end of received low-priority packet |
| abrt_R | Abort/discard current received high-priority packet |
| abrt_N | Abort/discard current received low-priority packet |
| abrt_RN | Abort/discard both preempting high-priority packet and the preempted low-priority packet |

Note that states p_rdy1, p_rdy2 and p_rdy3 are similar in that the receiver is in the preempt mode and expecting a high-priority packet in all these states. However, it is necessary to have p_rdy1 and p_rdy2 to ensure that all packets are recovered when surrounded by normal flags. Likewise, p_rdy2 and p_rdy3 are needed to tell whether or not it is legal to receive the end-preempt (EP) flag.

Embodiment of Communication Link Interfaces

FIG. 4 shows a block diagram of the transmitter 40 portion of the communication link interface of that communications system. Packets arrive from the communications system's packet source 41 for transmission on communication link 48. The packets may have been generated locally by this system or may have been received from another communication link on this system (e.g. an intermediate node in a packet network). The communications system places the high-priority packets into a high priority buffer 42 and places the low-priority packets into a low priority buffer 43. If no packets are stored in either high priority buffer 42 or low priority buffer 43, a flag generator 46 is connected to the communication link 48 via a bit multiplexer 47. The flag generator 46 repeatedly generates an idle flag X'7E', when no packets are stored for transmission.

When a low-priority packet arrives in the low priority buffer 43 and a packet is currently being transmitted, the transmitter 40 waits until all earlier packets in the low priority buffer 43 have been transmitted and the high priority buffer 42 is empty. When a low-priority packet is at the head of the low priority buffer 43 and no other packet is being transmitted on the communication link 48, bytes from the low priority buffer 43 are transferred one at a time through a byte multiplexer 44 to a parallel serial converter 45. The parallel serial converter 45 serializes the data and monitors the outgoing data for sequences of five consecutive '1' bits. It also inserts a single '0' bit immediately after each set of five '1' bits. The resulting bit stream is routed thru the bit multiplexer 47 to the communication link 48. When the transmission of the low-priority packet is complete, the bit multiplexer 47 selects the flag generator 46 for transmission to send at least one or more normal flags until the next packet is ready to be transmitted. Note that each time a flag is sent, the parallel serial converter 45 resets its internal count of the number of consecutive '1' bits.

If a low-priority packet is being transmitted from low priority buffer 43 and a high-priority packet arrives in the high priority buffer 42, then the transmission of the low-priority packet is preempted. The remaining bits in the parallel serial converter 45 along with any stuffed zero bits are transmitted guaranteeing a data byte boundary for the preempted packet, and then the flag generator 46 sends special start-preempt flag described earlier. Bytes from the high priority buffer 42 are then transferred through the byte multiplexer 44 to the parallel serial converter 45 which performs serialization and zero bit stuffing. The resulting high-priority packet is then transferred to the communication link 48. If, during the transmission of the high-priority packet, another high-priority packet arrives in the high-priority buffer 42, then the flag generator 46 sends a normal flag when the first high-priority packet is completed and transmitter 40 begins transmission of the next high-priority packets without exiting the preempt mode. When the last of the series of high-priority packets has been sent (there are no more packets waiting in the high priority buffer 42), the flag generator 46 sends the end-preempt flag described earlier. The remaining bytes from the preempted low-priority packet in the low priority buffer 43 are then released to the parallel serial converter 45 and the communication link 48. If a subsequent high-priority packet arrives at the high-priority buffer 42 prior to the completion of the preempted low-priority packet, the preemption and resume sequence is repeated. When the transmission of the low-priority packet is completed, the flag generator 46 transmits a normal ending flag.

FIG. 5 shows a block diagram of the receiver 50 portion of the communication link interface of the communications system up to a point at which received whole packets are passed to a packet target 56 within the communications system. The packet target 56 could be the final destination for the received packets or could be a packet switch used to route packets to other communication links for transmission to other nodes in a packet network. Any buffering associated with the packet target 56 is outside the receiver 50 and is not included in FIG. 5.

A flag detector 52 continuously monitors the bit stream received from a communication link 51 for normal, start-preempt and end-preempt flags. If a sequence of bits other than a flag is detected immediately following a normal flag, it indicates the beginning of a new frame. A serial parallel converter 53 receives the bit stream, discards any '0' bit if it immediately follows five consecutive '1' bits, and converts the remaining bits into byte-parallel form. If the received packet is a high-priority, packet, the parallel byte data is passed directly through a multiplexer 59 to a multiplexer 55 connected to the packet target 56 until a normal ending flag is detected by the flag detector 52. The receiver 50 indicates the end of the packet to the packet target 56.

If the received packet can be preempted (i.e. low-priority, non-real-time packet), then the parallel byte data is instead passed through byte multiplexer 59 to the preemptable packet buffer 54 in order to permit the entire packet to be accumulated before passing it to the packet target 56. If flag detector 52 detects a start-preempt flag and there is no partial byte in the serial parallel converter 53, then it indicates the beginning of a high-priority preempting packet and therefore the beginning of preempt mode. The bit stream is passed through the serial parallel converter 53 as before but this time the parallel byte data is passed directly through the multiplexers 59 and 55 to the packet target 56 within the communications system.

When the flag detector 52 detects either an normal ending flag or an end-preempt flag, then the receiver 50 indicates the end of the packet to the packet target 56. If a normal ending flag is detected, then the serial parallel converter 53 will continue to route the parallel byte data from subsequent packets directly to the multiplexer 55. If an end-preempt flag is detected, the receiver 50 will end preempt mode. The received bit stream will be routed through the serial parallel converter 53 and multiplexer 59 to the preemptable packet buffer 54 thus resuming reception of the preempted low-priority packet. If the flag detector 52 detects a normal ending flag indicating the end of the low-priority packet, the receiver 50 transfers the entire low-priority packet stored in the preemptable packet buffer 54 through the multiplexer 55 to the packet target 56.

FIG. 5 assumes that the transfer of a whole packet from the preemptable packet buffer 54 to the packet target 56 is accomplished before the first parallel data byte from a subsequent packet can be received. If the transfer takes longer than this in a particular implementation, a FIFO buffer can be placed after the serial parallel converter 53 to temporarily hold the receive data bytes until the transfer from the preemptable packet buffer 54 is complete. Also in some implementations, high-priority and low-priority packets may be passed to separate packet targets. In this case, the preemptable packet buffer 54 is not required.

While this invention has been particularly shown and described with reference to specific embodiments and examples, it will be understood by those skilled in the art that various changes in form and detail may be made without departing from the spirit and scope of the invention.

Having thus described our invention, what we claim as new and desire to secure by Letter Patent is:

1. For use in a multi-system network in which data may be transmitted in either low-priority data packets or high-priority data packets, a method for determining whether to use a preempt/resume protocol or an alternate protocol for transmitting data packets from a local system to a remote system over a connecting communications link having a known line speed, said method being practiced at the local system and comprising steps of:
 a) sending a message to the remote system, said sent message containing fields indicating 1) whether the local system supports use of a preempt/resume protocol and 2) the size of the largest low-priority data packet the local system can send;
 b) receiving a message from the remote system, said received message indicating 1) whether the remote system supports use of a preempt/resume protocol and 2) the size of the largest low-priority data packet the remote system can receive;
 c) if the sent and received messages indicate that either or both of the local and remote systems do not support use of a preempt/resume protocol, then choosing an alternate protocol; and
 d) if the sent and received messages indicate that both of the system support use of a preempt/resume protocol
  1) using field values in the sent and received messages, comparing the size of the largest low-priority data packet the local system can send to the size of the largest low-priority data packet the remote system can receive and selecting the lesser of the two sizes,
  2) based on the known line speed and the selected size, determining whether transmission of a low-priority data packet of the selected size from the local system would delay transmission of a subsequent data packet by more than a predetermined amount of time, and
  3) initiating use of a preempt/resume protocol only where the preceding step indicates transmission of a low-priority data packet of the selected size would delay transmission of a subsequent data packet by more than the predetermined amount of time.

* * * * *